United States Patent [19]

Eslinger

[11] Patent Number: 5,127,784
[45] Date of Patent: Jul. 7, 1992

[54] FATIGUE-RESISTANT BUTTRESS THREAD
[75] Inventor: David Eslinger, Duncan, Okla.
[73] Assignee: Halliburton Company, Duncan, Okla.
[21] Appl. No.: 340,941
[22] Filed: Apr. 19, 1989
[51] Int. Cl.$^5$ .................... F16B 35/04; F16L 25/00
[52] U.S. Cl. .................................. 411/414; 411/411; 285/334
[58] Field of Search ............ 411/411, 414, 423, 183; 403/307, 306; 285/333, 334

[56] References Cited

U.S. PATENT DOCUMENTS

| | | | |
|---|---|---|---|
| 3,433,117 | 3/1969 | Gowen, Jr. et al. | 411/411 |
| 4,258,768 | 3/1981 | Pamer et al. | 411/183 |
| 4,295,751 | 10/1981 | Holmberg | 411/411 |
| 4,346,920 | 8/1982 | Dailey | 411/411 |
| 4,549,754 | 10/1985 | Saunders et al. | 411/411 |
| 4,771,801 | 9/1988 | Crump et al. | 137/68.1 |
| 4,799,844 | 1/1989 | Chuang | 411/414 |

FOREIGN PATENT DOCUMENTS 194042  1/1965  Sweden .......................... 411/311

OTHER PUBLICATIONS

Standard Handbook for Mechanical Engineers, Seventh Edition, Theodore Baumeister, Editor, McGraw-Hill Book Company, published 1967.

Primary Examiner—Neill R. Wilson
Attorney, Agent, or Firm—James R. Duzan; Neal R. Kennedy

[57] ABSTRACT

A fatigue resistant buttress thread. The thread has a load flank angle of approximately 30° plus or minus approximately 5° and a relief flank angle of approximately 46° plus or minus approximately 5°. The thread engaged depth is approximately 0.232 times the pitch of the thread, and the thread has a root radius approximately 0.175 times the pitch. The thread is particularly well adapted for use in cover retainers for holding valves and rupture discs in plunger pumps. Finite element analysis and actual tests indicate a greatly improved fatigue resistance compared to previously known buttress threads and other thread forms.

17 Claims, 1 Drawing Sheet

FATIGUE-RESISTANT BUTTRESS THREAD

BACKGROUND OF THE INVENTION

1. Field of the Invention

This invention relates to buttress thread fasteners, and more particularly, to a buttress thread with a reduced thread root stress for fatigue resistance.

2. Description of the Prior Art

Fatigue resistance on fastener threads is important when the fasteners are subjected to cyclic loading. Such cyclic loading can occur in many applications, such as pressure vessels and in pumps and compressors in which the pressure varies, thus also varying the loads on the fasteners used therein. In most instances, normal bolting is satisfactory, but there are some applications in which special thread forms are desirable.

One such case is the thread on cover retainers used on plunger pumps such as the Halliburton Model HT-400. The cover retainers are used to retain valves and rupture discs in the fluid end of the pump, and the diameter of the thread is relatively large compared to the length of thread engagement. These cover retainers are used to actually clamp parts in place and are not limited to simply join two members together. Thread forms, such as square and Acme threads frequently used for power transmission, have been applied to these pump applications. However, such threads have relatively sharp corners and thus are not particularly well adapted for fatigue resistance.

One thread form which has been developed for heavy loading, and is good in clamping applications, is the American Standard buttress thread—American National Standards Institute (ANSI B1.9. This thread has a 7° load flank angle and a 45° relief flank angle and is quite strong. However, root stresses in this thread are actually higher than the normal Acme thread. Therefore, the ANSI B1.9 thread is also not well adapted for fatigue resistance.

The present invention which is a modified buttress thread having a relatively small thread height with a relatively large root radius provides the strength desired while greatly improving the fatigue life. In particular, for plunger pump applications, this improvement is very important, and the thread still retains its ability to clamp the corresponding components in place.

SUMMARY OF THE INVENTION

The fatigue-resistant buttress thread of the present invention comprises a pitch, a load flank angle in the range of approximately 25° to 35°, and a relief flank angle in the range of approximately 41° to 51°. The preferred load flank angle is approximately 30°, and the preferred relief flank angle is approximately 46°.

The thread height is preferably approximately 0.232 times the pitch. The preferred root radius is approximately 0.17 times the pitch. The pitch is in the range of approximately 0.25 inches to approximately 0.5 inches, and the preferred pitch is approximately 0.4 inches.

The thread form may be used in a fastener system comprising a member having an internal thread and an external thread adapted for engagement with the internal thread. The tip-to-root clearance between the internal and external threads is preferably approximately 0.04 inches.

In one embodiment, the fastener system is one in which the member having the internal thread is a fluid end portion of a pump, and the member having the external thread is a cover retainer for holding a valve or rupture disc in the pump. In one pump, the external thread has a tip diameter of approximately 5.75 inches.

An important object of the present invention is to provide a fatigue-resistant buttress thread which can be used in fastener systems.

Another object of the invention is to provide a fatigue-resistant thread system which can be used in cyclic loading, such as in pressure vessels, pumps and compressors in which the pressure varies.

Additional objects and advantages of the invention will become apparent as the following detailed description of the preferred embodiment is read in conjunction with the drawings which illustrate such preferred embodiment.

FIG. a fluid end of a plunger pump with cover retainers having the buttress thread of the present invention.

DESCRIPTION OF THE PREFERRED EMBODIMENT

Figure 1:
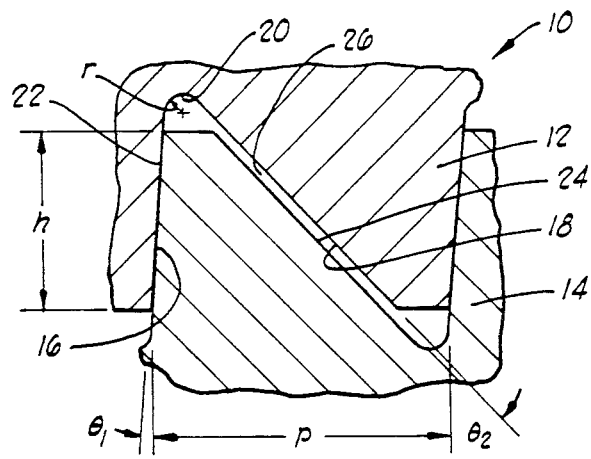
FIG. 1 illustrates the prior art American Standard buttress thread (ANSI B1.9).

Referring now to the drawings, and more particularly to FIG. 1, the American Standard buttress thread (ANSI B1.9) is generally shown and designated by the numeral 10. Thread system 10 includes first and second threaded members 12 and 14.

Referring to first threaded member 12, the thread form includes a load flank 16 and a relief flank 18. Load flank 16 and relief flank 18 intersect at a corner 20 which, as indicated in FIG. 1, has a radius r. The thread, of course, is generally helical. The thread in second threaded member 14 has a corresponding load flank 22 and relief flank 24. When first and second threaded members 12 and 14 are tightly engaged, there is a slight relief gap 26 between relief flanks 18 and 22.

Thread system 10 has a pitch p, which is the length of one thread. The height of the engaged thread is indicated by h. For the American Standard buttress thread (ANSI B1.9), thread engage depth h is approximately equal to 0.60 times the pitch, and the root radius r is approximately equal to 0.071 times the pitch. The load flank angle, $\theta_1$, is approximately equal to 7°, and the relief flank angle, $\theta_2$, is approximately equal to 45°.

Following standard engineering terminology, the term "flank angle" as used herein referred to the angle made by the flank of a thread with a line perpendicular to the axis of the threaded member. Also, the "load flank" is the flank of the thread which bears the load, and the "relief flank" is the flank of the thread which does not hear the load. These load and relief flank angles are shown in both FIGS. 1 and 2.

Figure 2:
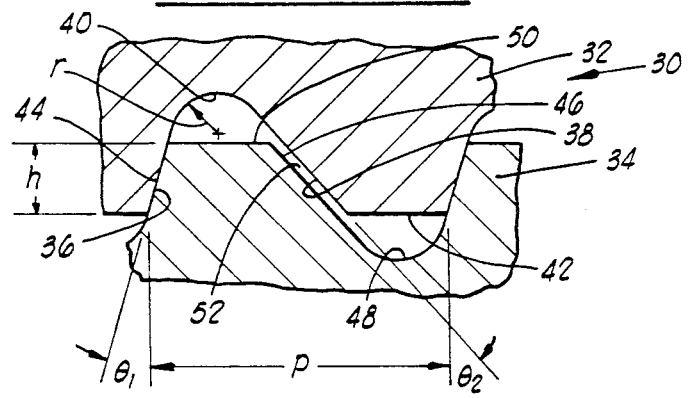
FIG. 2 illustrates the fatigue-resistance buttress thread of present invention.

Referring now to FIG. 2, the fatigue-resistant buttress thread system of the present invention is shown and generally designated by the numeral 30. Thread system 30 is formed by first and second threaded members 32 and 34, one of which is internal and the other external. The thread in first member 32 has a load flank 36 and a relief flank 38. Load flank 36 and relief flank 38 intersect at a corner or root 40 which has a radius r. A tip of the thread has a diameter 42.

Similarly, the thread in second threaded member 34 has a load flank 44 and a relief flank 46 joined at a radiused corner or root 48. The tip of the thread has a diameter 50.

When first and second threaded members 32 and 34 are threadingly engaged, load flanks 36 and 44 bear against one another, and a slight gap 52 is defined between relief flanks 38 and 46.

The buttress thread of the present invention has a pitch p. The load flank angle ($\theta_1$) is preferably approximately 30°, plus or minus 5°, and the relief angle ($\theta_2$) is preferably approximately 46°, plus or minus 5°. Also in the preferred embodiment, the thread engaged depth h is equal to approximately 0.232 times the pitch or approximately 36.7% that of the thread engaged depth of the American Standard buttress thread of FIG. 1. Buttress thread 30 of the present invention has a root radius of approximately 0.175 times the pitch or approximately 246% that of the root radius of the American Standard buttress thread.

Thus, buttress thread 30 with its smaller thread engaged depth has considerably less specific bending moment thereon for a specific pitch p as compared to the deeper American Standard buttress thread. Further, thread 30 has a considerably larger root radius which greatly lessens the stress concentrations at the thread root. Table I summarizes the comparison of buttress thread 30 with prior art buttress thread 10 and also with a standard Acme and a standard 30° V thread.

In Table I, p indicates thread pitch, and D indicates thread major diameter.

the approximate range of 0.25 to 0.5 inches, with a pitch of 0.4 inches being one preferred embodiment.

Table II presents thread root stresses calculated by finite element analysis for various threads.

TABLE II

COMPARISON OF FLUID END COVER THREAD ROOT STRESSES AS DETERMINED BY FINITE ELEMENT ANALYSIS FOR 9⅜ INCH THREAD WITH 2¼ INCH THREAD ENGAGEMENT LENGTH UNDER 555,000-POUND LOAD

| Thread Form | Finite Element Thread Root Stress, psi |
|---|---|
| Acme 0.25 pitch (ANSI B1.5) | 102,600 |
| 7°/45° 0.4 pitch buttress (ANSI B1.9) | 160,000 |
| 25°/46° 0.4 pitch buttress thread of the present invention | 75,100 |
| 30°/46° 0.4 pitch buttress thread of the present invention | 67,700 |

It is clear from Table II that the root stress level in the fatigue-resistant buttress thread 30 of the present invention has a significantly lower maximum root stress than the other previously known thread forms. It will also be seen that the root stress for the buttress thread having a 30° flank angle is lower than that in L- which the flank angle is 25°. Thus, although a 25° flank angle presents a great improvement over the prior art, the 30° angle has an even greater improvement and is thus a preferred embodiment when fatigue life is critical.

TABLE I

| | Comparison Of Thread Forms | | | | | |
|---|---|---|---|---|---|---|
| Thread | Contact Or Load Flank Angle $\theta_1$, Degrees | Relief Flank Angle $\theta_2$, Degrees | Thread Engaged Depth h | Total Thread Depth | Root Radius r | Shear Area (in$^2$/in) |
| Standard V Thread (ANSI B1.1) | 30 | 30 | 0.542 p | 0.62 p | 0.144 p | 2.358 (D-108 p) |
| Standard Acme (ANSI B1.5) | 14.5 | 14.5 | 0.50 p | — | — | 2 (D-p) |
| Buttress Thread (ANSI B1.9) FIG. 1 | 7 | 45 | 0.60 p | 0.663 p | 0.071 p | 2.62 (D-1.2 p) |
| Buttress Thread Of The Present Invention FIG. 2 | 30 ± 5 | 46 ± 5 | 0.232 p | 0.32 p | 0.175 p | 2.159 (D-0.464 p) |

Figure 3:
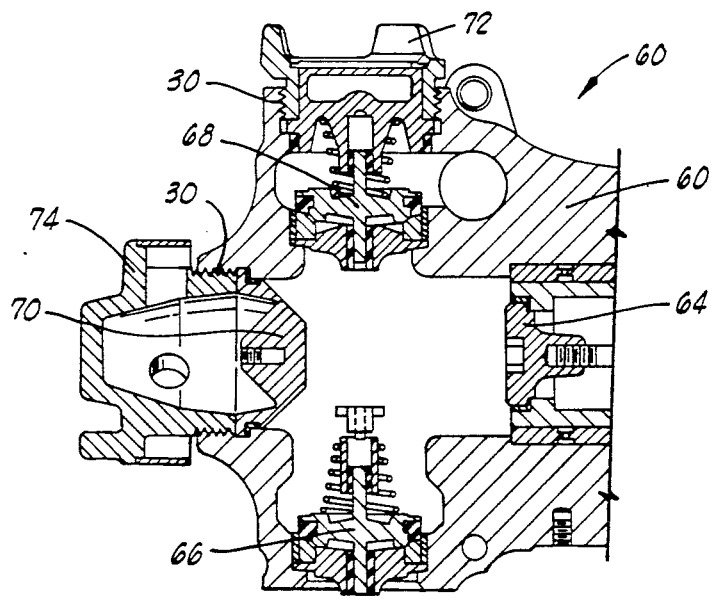

Referring now to FIG. 3, a plunger pump 60 is illustrated and is of the type which utilizes fatigue-resistant buttress thread 30. FIG. 3 shows the fluid end of pump 60 with a cylinder 62 having a reciprocating plunger 64 therein. Fluid enters through a suction valve 66 and is discharged through a discharge valve 68. A rupture disc 70 prevents overpressure. Discharge valve 68 is held in place by a cover retainer 72 which is engaged with cylinder 62 by buttress thread 30. Similarly, rupture disc 70 is held in place by a cover retainer 74 which also utilizes buttress thread 30 to engage cylinder 62. As plunger 64 reciprocates, the pressure in cylinder 62 varies which applies a cyclic loading to cover retainers 72 and 74 and thus to buttress threads 30. The fatigue resistant design of buttress thread 30 is well adapted to minimize fatigue failures in the thread.

A typical thread major diameter D for buttress thread 30 in pump 60 is 5.75 inches. The preferred pitch p is in The lower root stress of buttress thread 30 has been shown in testing to greatly improve the fatigue life of a cover retainer 72 or 74. Table III gives a summary of fatigue test results comparing buttress thread 30 of the present invention with a standard Acme thread.

TABLE III

SUMMARY OF THREAD FATIGUE TEST RESULTS CONSTANT ENGAGEMENT LENGTH

| Specimen | Thread Type | Thread Fatigue Life No. of Cycles at 242,000 lbs |
|---|---|---|
| 1 | 5¾ inch Acme 0.25 pitch | 82,000 |
| 2 | 5¾ inch Acme 0.25 pitch | 113,000 |
| 3 | 5¾ inch Acme 0.25 pitch | 58,800 |
| 4 | 5¾ inch Acme 0.25 pitch | 74,100 |
| 5 | 5¾ inch 30°/46° buttress 0.4 pitch | 2.3 × 10$^6$ |
| 6 | 5¾ inch 30°/46° buttress 0.4 pitch | 2.1 × 10$^6$ |

TABLE III-continued

SUMMARY OF THREAD FATIGUE TEST RESULTS
CONSTANT ENGAGEMENT LENGTH

| Specimen | Thread Type | Thread Fatigue Life No. of Cycles at 242,000 lbs |
|---|---|---|
| 7 | 5¾ inch 30°/46° buttress 0.4 pitch | $1.1 \times 10^6$ |
| 8 | 5¾ inch 30°/46° buttress 0.4 pitch | 702,000 |

Table III clearly shows that buttress thread 30 of the present invention has a greatly improved fatigue life over that observed for the standard Acme thread. Because the root stresses in the American Standard buttress thread are higher than the Acme, presumably the fatigue life is correspondingly lower for the American Standard buttress thread than the Acme.

It will be seen, therefore, that the fatigue-resistant buttress thread of the present invention is well adapted to carry out the ends and advantages mentioned as well as those inherent therein. In particular, the present buttress thread has greatly reduced root stresses and correspondingly higher fatigue life. The thread is also well adapted for use in cover retainers on reciprocating plunger pumps, but is not intended to be limited to such applications. While a presently preferred embodiment of the invention has been shown for the purposes of this disclosure, numerous changes in the arrangement and construction of parts may be made by those skilled in the art. All such changes are encompassed within the scope and spirit of the appended claims.

What is claimed is:

1. A thread form for providing fatigue resistance in cycling loading situations, said thread form comprising:
    a pitch;
    a load flank having a load flank angle in the range of approximately 25° to 35°;
    a relief flank having a relief flank angle in the range of approximately 41° to 51°; and
    a root radius intersecting said load flank and said relief flank.

2. The thread form of claim 1 further comprising a thread height approximately 0.232 times said pitch.

3. The thread from of claim 1 wherein said root radius is approximately 0.17 times said pitch.

4. The thread form of claim 1 wherein said pitch is in the range of approximately 0.25 inches to approximately 0.5 inches.

5. The thread form of claim 4 wherein said pitch is approximately 0.4 inches.

6. The thread form of claim 1 wherein said load flank angle is approximately 30°.

7. The thread form of claim 1 wherein said relief flank angle is approximately 46°.

8. A fastener system adapted for cyclic loading fatigue resistance, said fastener system comprising:
    a member having an internal thread comprising:
        a load flank angle of approximately 30°; and
        a relief flank angle of approximately 46°; and
    a member having an external thread adapted for engagement with said internal thread and comprising:
        a load flank angle of approximately 30°; and
        a relief flank angle of approximately 46°.

9. The fastener system of claim 8 wherein:
    said internal thread has a thread depth of approximately 0.23 times a pitch of said internal thread; and
    said external thread has a thread height of approximately 0.23 times a pitch of said thread.

10. The fastener system of claim 8 wherein said internal and external threads have a pitch in the range of approximately 0.25 inches to 0.5 inches.

11. The fastener system of claim 10 wherein said pitch is approximately 0.4 inches.

12. The fastener system of claim 8 wherein said internal and external threads have a root radius approximately 0.175 times a pitch thereof.

13. The fastener system of claim 12 wherein said pitch is in the range of approximately 0.25 to 0.5 inches.

14. The fastener system of claim 13 wherein said pitch is approximately 0.4 inches.

15. The fastener system of claim 8 wherein a tip to root clearance between said internal and external threads is approximately 0.04 inches.

16. The fastener system of claim 8 wherein said external thread has a tip diameter of approximately 5.75 inches.

17. The fastener system of claim 8 wherein:
    said member having said internal thread is a fluid end portion of a pump; and
    said member having said external thread is a cover retainer.

* * * * *